June 28, 1938. E. J. O. SAELEN 2,122,215
ELECTRICALLY ILLUMINATED FISH LURE
Filed Aug. 4, 1936
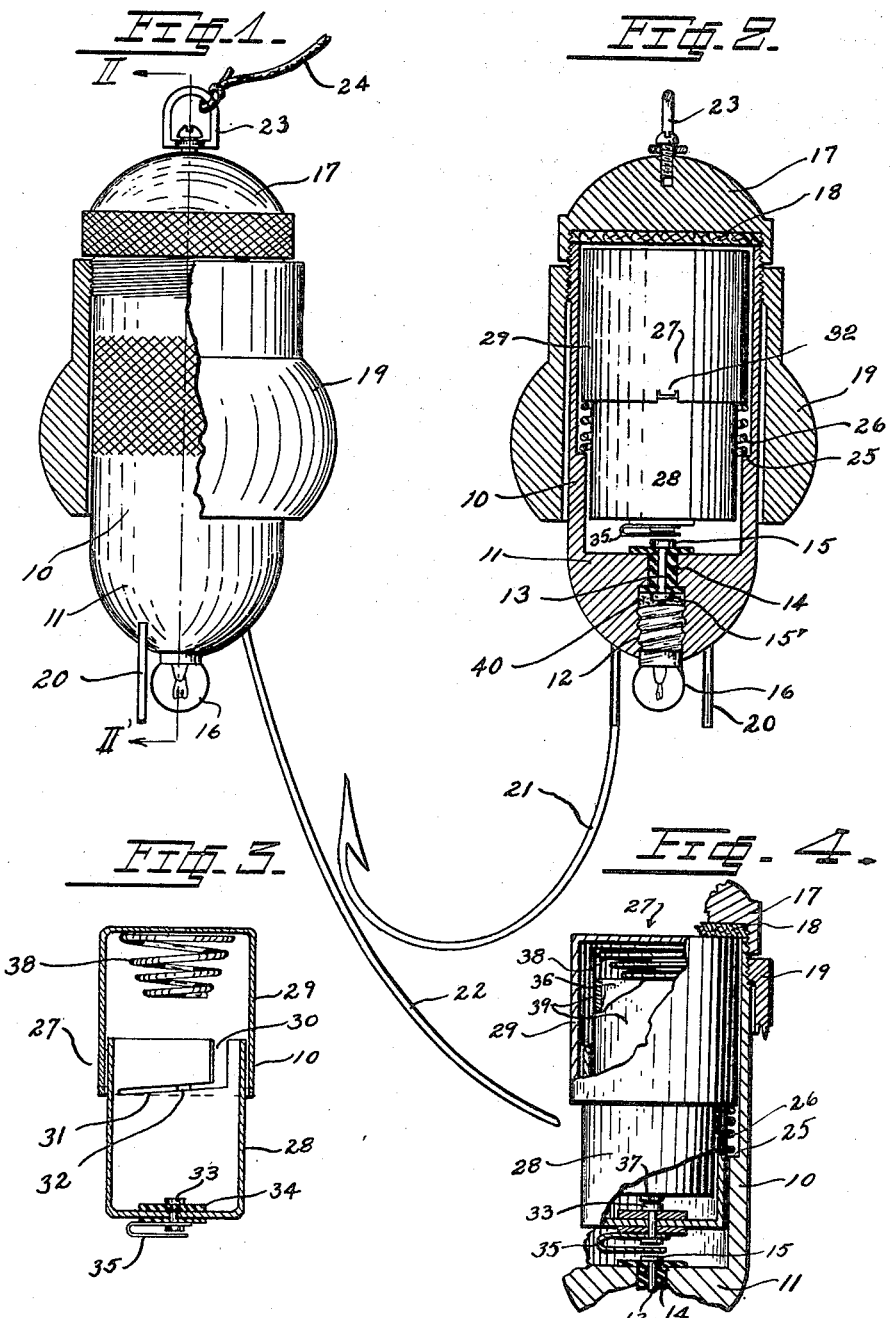
Inventor:
Erling J. O. Saelen,
By: Horace S Woodward
Attorney.

Patented June 28, 1938

2,122,215

UNITED STATES PATENT OFFICE 2,122,215

ELECTRICALLY ILLUMINATED FISH LURE

Erling Johan Olsen Saelen, Bergen, Norway

Application August 4, 1936, Serial No. 94,240
In Sweden September 23, 1935

5 Claims. (Cl. 43—44)

The present invention relates to a fishing device equipped with an electric battery and a lamp and means for closing an electric circuit for energizing the lamp, the rays of which attract the fish to the device.

In known fishing devices of this character, the lamp and the battery together are built into a watertight container and the rays from the lamp projected through a glass-covered opening in the wall of the container.

Prior devices of this character are very complicated in construction and have many disadvantages. For example, in order to replace a burned out lamp or battery the whole operating mechanism has to be withdrawn from the container. Further it has been impossible to make the glass covered opening tight against the water pressure, especially in great depths and consequently the water leaks into the interior of the device, thereby affecting the battery. Further, the glass is easily bedewed on account of the temperature difference between the sea and the interior of the chamber (the latter being initially much warmer as a rule, especially in summer), thereby making a very poor, dim light. Finally, these old devices have a very poor light distribution, as the rays—due to the placing of the lamp in the interior of the chamber—are projected through a relatively small light opening, making it impossible for the fish to see the light from the side or from above at some distance therefrom.

One object of the invention is to eliminate these and other disadvantages, and according to the invention there is provided an improved form of electric illuminated fishing lure having a watertight compartment for the electric battery and a lamp arranged outside the compartment; the lamp receptacle or socket receiving the lamp base being filled with a plastic, water resistant as well as electric insulating mass, thereby preventing entrance of water to the compartment.

Another object of the invention is to provide a novel circuit closing means in which the inertia of the battery may be utilized to cause closing of the circuit in response to more or less abrupt movement of the case of the article in response to pulls on the fish line, so that the light may be controlled by the angler without removal from the water, but while submerged at any desired depth incident to normal fishing.

Additional objects, advantages and features of invention will appear from the following description and accompanying drawing, wherein Figure 1 is an elevation partly in section of a fish lure, embodying my invention.

Figure 2 is a vertical section of the case on the line I—I of Figure 1.

Figure 3 is a vertical section of the battery cell casing detached.

Figure 4 is a fragmentary vertical section of the complete assembly showing the battery cell in place.

There is illustrated a lure device, which may be a bait adapted to be swallowed by a fish, or may be simply a lure to draw fish to a separate bait, or into position to be snagged, or may be simply an illuminant of a bait suspended thereadjacent. It may be of similar construction in any of these uses except for the manner of attachment or connection of the angling devices thereto.

In the present embodiment it comprises a main case 10, in the form of a cylindrical shell having an integral thickened and semi-spherical lower end or head 11, axially apertured to form a threaded lamp socket 12 at the outer part and a reduced passage therefrom into the case, in which a contact pin 13 is fixed and insulated by means of a bushing 14, of hard rubber or other suitable water resistant insulating material. The contact pin 13 has contacts 15 and 15' properly exposed within the case and axially within the socket, and a conventional lamp 16 has its base screwed into the socket, its central axial end contact engaging the outer head 15' of the pin 13. The inner end 15 of the pin is utilized as one element of a switch (as will be explained), to complete a circuit to a battery cell in the case. The upper end of the case is exteriorly threaded and has screwed thereon a cap piece 17, within which a gasket 18 is confined tightly against the edge of the case as a seal. The gasket also serves as a silencing cushion in certain functions of the device, as will be explained. The threads on the case extend also a distance below the cap, permitting a weight ring 19 to be screwed thereon from below without disturbing the cap. This weight is extended a distance longitudinally around the case, and thickened at its lower part so that the center of gravity of the article is below its symmetrical center, thus assuring the maintenance of the device in a substantially vertical position as shown in Figure 1, when submerged. The weight is spaced from the case except where its threads engage those of the case. The case is also provided with a suitable guard means 20 consisting of a series of rigid or resilient pins fixed at their bases on the case around the lamp 16 and extending longitudinally outward beyond the lamp. A hook 21 may be permanently or detachably secured directly to the bottom of the case, or an arm 22 may be provided on the case extended longitudinally therebelow in suitable relation to the lamp, to which arm the snell, snood or leader of a hook may be attached, as will be understood by anglers.

The article is provided with a swivel eye piece 23 mounted centrally on the cap 17, to which a usual fish line 24 may be attached as required.

The case is formed with an upper enlarged part forming an interior shoulder or spring seat 25 just below its middle, on which there is engaged a light helical spring 26 lying close to the wall of the case and extending upwardly to support a two-piece cylindrical telescopic battery casing 27. This battery casing is a simple receptacle comprising a lower part 28 of small diameter, and an upper part 29 of larger diameter fitting snugly and slidably around the lower section. The spring 26 supports this casing by engaging against the lower edge of the upper section. A bayonet slot 30 is formed in the lower section, the lateral extension 31 of which is inclined as shown, and on the top section a pin or lug 32 is formed to engage in the slot. By rotating one section on the other, movement of the lug in the extension 31 of the slot will cause relative longitudinal movement of the two sections so that the aggregate length of the casing 27 may be adjusted, for purposes which will be explained.

In the bottom of the casing 27 a cell contact and switch pin 33 is fixed in a suitable rubber or other suitable insulating bushing 34, and has fixed on its outer end a feathering or resilient contact spring or switch 35 the function of which will be explained hereinafter. Within the casing 27 a conventional dry battery cell 36 is disposed, the positive electrode 37 of which abuts the inner head of the pin 33, against which it is firmly pressed by means of a protractile helical spring 38 confined between the cell and the top section of the casing 27. The end wall of the cell as is familiar in such batteries, forms the negative electrode thereof, and the spring 38, the casing 27 and spring 26 serve to complete the circuit from the negative pole of the cell to the case 10 and socket 12 of the lamp, as will be understood. The cell is provided with the usual jacket 39 of paper or other material, usually having the property of a dielectric.

The spring 38 is formed with a strength to support the casing 27, but yieldable to additional force which may be readily transmitted by a slight jerk of the finger of an angler on the fishline to the case 10, causing the spring to yield and permit the switch 35 to engage the contact 15 on the case 10. This would cause closing of the circuit from the battery to the lamp and cause illumination by the lamp momentarily. The switch 35 is formed of very thin resilient sheet material so light that it will yield slightly when it engages the contact 15, and act as a cushion for the cell and its casing, and also result in more than a merely instantaneous make and break, but prolong the contact for the time involved in the movement of the casing relatively to the case from the moment of first contact of the switch 35 with the contact 15, compression of the switch, and separation thereof from the contact 15 again. This time may be comparatively short, but will result in a higher efficiency of illumination, either by the affording of a better heating of the filament of the lamp, or by such prolongation of the flash of light as to give better registration on the retina of a fish.

The time of the contact of the switch 35 and switch contact 15 may also be lengthened by the character of the pull exerted by the fisherman on the line, but the use of the feathering contact will avoid illumination of too short duration in the case of a fisherman of nervous movement or of irregular manipulation of the fishline, or operation by inexperienced persons without knowledge of the proper technique and desirable function of the device.

In use, in case a continuous illumination is desired, the two sections of the casing 27 are rotated counterclockwise just before the device is submerged, so that when the casing 27 containing the cell is introduced into the case 10 and the cap 17 screwed down, the lower end of the casing 27 will be pressed downward far enough to engage the switch 35 with the contact 15 and retain it so engaged.

A series of the weight rings of different weights, proportioned to various depths at which fishing may be conducted, may be made up, and the proper one selected and screwed into place on the case 10, after which fishing may be conducted in accordance with the knowledge and technique of the fisherman developed therein.

By the adjustment of the sections of the casing 27 short of continuous contact at the switch 35—15, a certain range of adjustment is permissible to vary the distance between the contacts, so that a stronger or weaker pull on the line will be required to cause energization of the lamp. With this arrangement, when the device is lowered into the sea and when hanging vertically as it will automatically tend to do, the lamp is normally unlighted. By intermittent pulls on the line however, the necessary movements of the battery casing in the case 10 are caused to produce intermittent flashes of light, by which the fish will be attracted. The gasket 18 and the switch 35 constitute shock absorbing means exteriorly of the casing 27, for the casing parts. The article may be made small enough to form part of a bait to be swallowed by the fish angled for, or may be made larger as a separate illuminating device, according to the needs of the users.

In the socket 12 a waterproof plastic 40 is introduced, having electrical insulating properties completely filling the space around the lamp base and between the base and the inner part of the socket, preventing ingress of water and reducing liability of corrosion of the contacts of the lamp base in the socket. In assembly, more of the plastic 40 may be introduced into the socket than is required, before the lamp is screwed into place, and when the lamp is screwed into the socket, the excess plastic is thereby extruded outwardly around the lamp base owing to the loose fit of the lamp and socket threads, while the contact on the lamp base penetrates the plastic so as to make a good contact with the contact 15', and the outer sides of the threads on the lamp base press against the inner sides of the threads of the socket so as to effect a good line contact.

It should be understood that the invention is not limited to the embodiment shown, but the same may be varied within the scope of the claims.

Having now particularly described and ascertained the nature of my said invention and in what manner the same is to be performed, I declare that what I claim is:—

1. An electric illuminated fishing device comprising a water-tight case, a lamp at the lower end thereof, a casing vertically slidable in the case, a battery in the casing, said casing being connected to one pole of the battery, said casing being formed in two telescoping parts relatively revoluble, one part having a bayonet slot therein with an inclined lateral extension, a lug on the other part engaged slidably in the slot whereby relative rotation of the casing parts will vary its length, said case having an insulated contact at one end, an insulated contact on the casing connected to the pole of the battery and positioned to engage the said contact on the case by sliding movement of the casing in the case, and a spring in the case in supporting relation to the casing constructed to hold the last named two contacts in open position yieldable to inertia of the casing and contents when the device is moved abruptly upward.

2. An electric illuminated fishing device comprising a water-tight case, a lamp thereon, a casing slidable within the case, a battery in the casing and grounded thereon at one pole, a fixed contact on the case, a contact on the casing connected to the opposite pole of the battery positioned and adapted to engage the fixed contact by sliding movement of the casing in the case, a conductive normally supporting spring in the case exteriorly of the said casing positioned and engaged with the casing to hold said contacts open yieldingly, one of said contacts including a resilient yielding feathering brush element, and means to connect a fish line to the case.

3. An electric illuminated fishing device comprising a water-tight case, a lamp at the lower end thereof, a battery within the case, open circuit electrical connections between the battery and lamp including a member movable to close the circuit, yielding means to support said member in open circuit position, the case having external threads thereon, and a removable annular internally threaded weight member screwed on the case.

4. The structure of claim 3 in which the case includes a body receptacle, a closing cap screwed on said external threads at their upper part, and said weight member is screwed on the lower part of said external threads below the cap.

5. The structure of claim 3 in which the said circuit closing member is movable longitudinally of the axis of the case, and said weight member is of reduced mass adjacent its threaded engagement with the case and is longitudinally extended from the threads of the case below the center of gravity of the device and is formed with an enlarged mass below said center.

ERLING JOHAN OLSEN SAELEN.